United States Patent
Yamashita et al.

(10) Patent No.: US 6,995,488 B1
(45) Date of Patent: Feb. 7, 2006

(54) PERMANENT MAGNET FIELD SMALL DC MOTOR

(75) Inventors: Fumitoshi Yamashita, Nara (JP); Yuichiro Sasaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 474 days.

(21) Appl. No.: 10/069,585

(22) PCT Filed: Aug. 25, 2000

(86) PCT No.: PCT/JP00/05733

§ 371 (c)(1),
(2), (4) Date: Jun. 28, 2002

(87) PCT Pub. No.: WO01/17093

PCT Pub. Date: Mar. 8, 2001

(30) Foreign Application Priority Data

Aug. 27, 1999 (JP) ................................. 11-241107

(51) Int. Cl.
*H02K 21/26* (2006.01)
*H02K 23/04* (2006.01)

(52) U.S. Cl. ............................ 310/154.21; 310/154.08

(58) Field of Classification Search ................. 310/46, 310/154.03, 154.06, 154.08, 154.05, 154.09, 310/154.12, 154.14, 154.15, 154.16, 154.21, 310/154.22, 154.23, 154.25, 154.29, 154.32, 310/156.01, 156.13, 156.16, 156.28, 156.29, 310/156.38, 156.39; 29/596
See application file for complete search history.

(56) References Cited

U.S. PATENT DOCUMENTS

| 457,214 | A | * | 8/1891 | Richards ...................... 126/208 |
| 4,283,647 | A | * | 8/1981 | Herr et al. ............. 310/154.22 |
| 4,687,608 | A | * | 8/1987 | Eino .......................... 427/130 |
| 4,703,210 | A | * | 10/1987 | Abukawa et al. ....... 310/154.28 |
| 4,710,239 | A | * | 12/1987 | Lee et al. ................... 148/101 |
| 4,774,426 | A | * | 9/1988 | Mohr et al. ............. 310/154.22 |
| 4,794,291 | A | * | 12/1988 | Abukawa et al. ...... 310/154.26 |

(Continued)

FOREIGN PATENT DOCUMENTS

JP  S49-4651  2/1974

(Continued)

OTHER PUBLICATIONS

National Technical Report, vol. 40, No. 5, Oct., 1994 (Osaka), Fumitoshi Yamashita, et al., "Tei Kido Hakutai to HD Funtai no Kyuurei Jishaku e no Ouyou", pp. 92-99.

(Continued)

*Primary Examiner*—Burton S. Mullins
*Assistant Examiner*—Heba Elkassabgi
(74) *Attorney, Agent, or Firm*—Wenderoth, Lind & Ponack, L.L.P.

(57) ABSTRACT

A permanent magnet field small DC motor includes an arc-shaped rare earth magnet of maximum thickness 1 mm or less fabricated by compression molding from rare earth iron based melt-spun flakes and a binder. The magnet is provided with a certain specific portion at both ends in the circumferential direction, which has no back yoke when the magnet is press-fit in a soft-magnetic frame. The arc-shaped rare earth magnet fabricated by compression molding from a material containing more rare earth iron based melt-spun flakes exhibits simultaneous increase of both a remanence as a function of magnetizing field and a coercivity; and hence, exhibits a well-balanced demagnetization curve even in an unsaturated magnetized state.

11 Claims, 4 Drawing Sheets

U.S. PATENT DOCUMENTS

| | | | | |
|---|---|---|---|---|
| 4,855,630 A | * | 8/1989 | Cole | 310/156.28 |
| 5,034,641 A | * | 7/1991 | Komuro et al. | 310/154.22 |
| 5,105,113 A | * | 4/1992 | Ishikura et al. | 310/154.29 |
| 5,173,206 A | * | 12/1992 | Dickens et al. | 252/62.54 |
| 5,204,569 A | * | 4/1993 | Hino et al. | 310/154.28 |
| 5,206,556 A | * | 4/1993 | Hayakawa | 310/154.28 |
| 5,281,881 A | * | 1/1994 | Gentry et al. | 310/154.13 |
| 5,329,267 A | * | 7/1994 | Endoh et al. | 335/222 |
| 5,353,491 A | * | 10/1994 | Gentry et al. | 29/596 |
| 5,495,658 A | * | 3/1996 | Teshigawara et al. | 29/598 |
| 5,723,929 A | * | 3/1998 | Niimi | 310/154.43 |
| 6,175,176 B1 | * | 1/2001 | Vogler | 310/156.16 |
| 6,462,448 B1 | * | 10/2002 | Du | 310/154.21 |
| 6,492,755 B1 | * | 12/2002 | Jones | 310/156.12 |
| 6,568,064 B2 | * | 5/2003 | Kanno et al. | 29/596 |
| 6,707,361 B2 | * | 3/2004 | Blume | 335/296 |
| 6,708,388 B1 | * | 3/2004 | Yamashita et al. | 29/596 |

FOREIGN PATENT DOCUMENTS

| | | | |
|---|---|---|---|
| JP | 2-223342 | | 9/1990 |
| JP | H5-50980 | | 7/1993 |
| JP | 6-236807 | | 8/1994 |
| JP | 06236807 | * | 8/1994 |
| JP | 8-84447 | | 3/1996 |
| JP | 06243377 | * | 3/1996 |
| JP | 10201206 A | * | 1/1997 |
| JP | 11098799 | * | 9/1997 |
| JP | 10-160866 | | 6/1998 |
| JP | 10-174318 | | 6/1998 |
| JP | 10-201206 | | 7/1998 |
| JP | 11-18390 | | 1/1999 |
| JP | WO01/20754 A1 | * | 9/2000 |

OTHER PUBLICATIONS

Fumitoshi Yamashita, "Kaden Seihin no Shou Energy to Jishaku Motor", Nippon Ouyou Jiki Gakkaishi, vol. 23, No. 6, Jun., 1999, pp. 1777-1782.

Fumitoshi Yamashita, "Koukan Spring Jishaku no Jiki Anteisei to sono Jishaku Maisatsu Ittaigata Kaitenshi", *Matsushita Technical Journal*, vol. 44, No. 2, Apr., 1998 (Osaka), pp. 78-86.

Shogo Tanaka, "Application of Permanent Magnets for Small Motors", p. 7 in the proceedings for the Symposium of Small Motor Technology, 1983).

J. F. Herbest, R.W. Lee, and F. E. Pinkerton, "Rare Earth-Iron-Boron Materials: A New Era in Permanent Magnets", Physics Department, General Motors Research Laboratories, 1986, pp. 467-485.

* cited by examiner

PERMANENT MAGNET FIELD SMALL DC MOTOR

TECHNICAL FIELD

The present invention relates to a permanent magnet field small DC motor having a thin arc-shaped rare-earth magnet of a maximum thickness of 1 mm or less. The motor operating on a low starting voltage and a low starting current yet yielding a high output with an accurate revolving performance at a lower cogging torque. A typical field of application of these motors is in an optical pickup for a MD, CD-ROM and the like audio-visual equipment.

BACKGROUND ART

FIG. 1(a) is a cross sectional view at a key portion of a permanent magnet field small DC motor relating to the present invention; FIG. 1(b) shows an arc-shaped magnet used in the motor. In the drawings, a pair of arc-shaped magnets 1, a soft-magnetic frame 2, an armature 3, which includes a brush-rectifier, a rotating shaft and a bearing, and a U-shaped spring 4 for pressing and securing the pair of arc-shaped magnets 1 in the soft-magnetic frame 2 are shown. The permanent magnet field small DC motor under discussion is requested to be further miniaturized, yet to provide a higher output and an accurate revolving performance, like in other permanent magnet motors.

As a general rule among the permanent magnet field small DC motors, it is difficult to maintain the output with a diameter of the armature 3 reduced. Especially in a motor using a ferrite magnet, whose maximum energy product [BH] max is low irrespective of whether it is fabricated by sintering, or by compression molding, injection molding or extrusion molding of a material mixed with a resin binder, the air-gap between the arc-shaped magnet 1 and an armature 3 is not provided with a sufficiently strong static magnetic field when miniaturized. Hence, the output is significantly reduced. In an attempt to provide the air-gap between the arc-shaped magnet 1 and the armature 3 with strong static magnetic fields among the miniaturized motors, a rare-earth magnet in an arc-shape whose maximum thickness is 1 mm or less, which exhibiting a so-called high [BH] max value, has been required.

Regarding the arc-shaped rare-earth magnet whose maximum thickness is 1 mm or less, Japanese Patent Laid-open Publication No. H6-236807 discloses a method for fabricating an arc-shaped rare-earth magnet. The method comprising the steps of pouring a melted mixture of thermo-plastic resin-binder and various kinds of rare-earth iron based magnetic powders, ranging from anisotropic to isotropic, into a mold, and extrusion molding while cooling it below a melting point of the thermo-plastic resin-binder. According to the disclosure, an arc-shaped rear-earth magnet of 0.9 mm thick can be produced at a thickness variation ±30 µm through extrusion molding from a bonded-magnet compound of, for example, isotropic rare-earth iron based melt-spun flakes 95 weight % and a thermo-plastic resin consisting mainly of 12-nylon. However, it is also mentioned that there is a difficulty in conducting a compression molding of rare-earth-based melt-spun flakes together with a resin-binder. In the extrusion molding, the thermo-plastic resin in the melted state has to perform a role of a carrier for the rare-earth iron based melt-spun flakes. So, as compared to a compression molded rare earth magnet, which is prepared from rare-earth iron based melt-spun flakes mixed with a thermosetting resin of normally 3 weight % or less, the content of rare-earth iron based melt-spun flakes needs to be lowered in the magnet of the above disclosure. Accordingly, the [BH] max value of the magnet becomes lower, and the static magnetic fields between the arc-shaped magnet 1 and the armature 3 become weaker.

One of the problems with the permanent magnet field small DC motor comprising the arc-shaped rare earth magnet fabricated through the above extrusion molding, which provides a stronger static magnet field in an air-gap to the armature 3 as compared to a ferrite magnet motor, is an increased cogging torque. This is the torque pulsation due to permeance changes as a result of revolution of the armature 3 caused by iron core teeth 31 and a slot 32 existing on the outer circumferential surface of the armature 3 disposed opposing to the arc-shaped magnet 1. The cogging torque is a substantial problem among the permanent magnet field small DC motors which are expected to be compact in size, yet required a high mechanical output with an accurate revolving performance. The motors are the object of the present invention.

Among the motors having an arc-shaped magnet, regardless whether it is a rare earth magnet or not, known technologies for reducing the cogging torque through a shape of the arc-shaped magnet include making a radius of the outer surface of the arc-shaped magnet to be different from that of the inner surface, or cutting edges at both ends in the circumferential direction of an arc-shaped magnet, thereby making a distribution of flux density in the air-gap closer to a sine curve (an example of a publication: Shogo Tanaka, "Application of Permanent Magnets for Small Motors", page 7 in the proceedings of the Symposium of Small Motor Technology, 1983). Japanese Utility Model Publication No. S49-4651 discloses that, in a permanent magnet field small DC motor, a cut provided in an arc-shaped magnet in the outer surface at both sides off of the center of the magnetic pole suppresses reduction of effective flux at the center of magnetic pole, despite the reduction at the cut portion. Although there is no mention about the cogging torque in the Utility Model, there is an indication about a possibility that the cut provided in an arc-shaped magnet in the outer surface at both sides off of the center of the magnetic pole would reduce the cogging torque in a permanent magnet field small DC motor, while controlling deterioration of the rotating torque.

A practical means for reducing the cogging torque in a permanent magnet field small DC motor, including the use of a thin arc-shaped rare earth magnet, is disclosed in Japanese Patent Laid-open Publication No. H11-18390. The disclosed means has a relevance with a method shown in FIGS. 2(a), (b). In the drawings, a pair of arcuate permanent magnets 1, a soft-magnetic frame 2, an armature 3 including a brush-rectifier, a rotating shaft and a bearing, and hooking protrusions 21 for fitting and securing the pair of arc-shaped permanent magnets 1 to the soft-magnetic frame 2 are shown.

According to the disclosure, (1) the radius curvature of an arc-shaped magnet 1 at the outer surface is deviated from that of the inner surface so that the air-gap between the magnet and an armature core increases along with the increasing distance along the direction of circumference from the center of a magnetic pole towards both ends, namely, a structure of so-called uneven air-gap, (2) the arc-shaped magnet having deviated radius curvature in the outer surface and inner surface is provided with a cut portion 11 so that there is an air-gap between the arc-shaped magnet and the soft-magnetic frame 2, and (3) the arc-shaped magnet 1 is slightly bent and fitted to be secured in the soft-magnetic frame 2 between the hooking protrusions 21. (An arc-shaped rare earth magnet with 12-nylon fabricated by extrusion molding, reference the Japanese Patent Laid-open Publication No. H6-236807, can be slightly bent.)

The direction of thrust in the arc-shaped rare earth magnet 1 coincides with that of extrusion in the extrusion molding, so the cross sectional shapes in a direction remain identical as shown in FIG. 2(b). Therefore, when an arc-shaped rare-earth magnet 1 is secured in a soft-magnetic frame 2 with both ends thinned in the circumferential direction of the magnet 1, at which a vacant space is formed to the soft-magnetic frame 2, engaged by the hooking protrusions 21, the bent quantity at magnet 1 might increase depending on the variation in thickness value ±30 m in the magnet 1. This can lead to a crack, tip-cut, etc. of the magnet 1 at the engagement portion, or the magnet 1 even might drop off the frame. Thus, there is a possibility of serious hazards in the reliability of the permanent magnet field small DC motors in the above disclosure.

Next, a practical means for fixing a thin arc-shaped rare earth magnet to a soft-magnetic frame of permanent magnet field small DC motors is disclosed in Japanese Patent Laid-open Publication No. H11-18390, which is shown in FIGS. 3(a), (b).

In the drawings, a pair of arc-shaped permanent magnets 1, a portion 11 of magnet for reducing cogging torque, engagement portions 12 of the magnet, a soft-magnetic frame 2, an armature 3 including the brush-rectifier, shaft and bearing, and hooking protrusions 21 for fixing and securing the pair of arcuate permanent magnets 1 in the soft-magnetic frame 2 are shown.

According to the disclosure, an arc-shaped rare earth magnet 1 has two or more different shapes in the cross section along the thrust direction; namely, a shape of the engagement portion 12 which is to be fitted in between the hooking protrusions 21 of the soft-magnetic frame 2 and a shape of the portion 11 for reducing cogging torque. The means for reducing cogging torque disclosed in the above Laid-open patent remains identical to that taught in the Japanese Patent Laid-open Publication No. H10-201206, which is generally known means like deviating curvatures or cutting corners of a magnet. The problems of a crack, tip-cut, etc. of an arc-shaped rare earth magnet 1 at the engagement portion that might arise when it is fixed and secured in a soft-magnetic frame 2, or a drop-off of a magnet 1, which are relevant to the Japanese Patent Laid-open Publication No. H10-201206, can be significantly improved.

However, there is a difficulty in fabricating by, for example, extrusion molding an arc-shaped rare earth magnet of maximum thickness 1 mm or less that has two or more shapes in the cross section along the thrust direction. Providing the portion 11 for reducing the cogging torque will need a post machining process of cutting off both ends in the circumferential direction. Cutting a thin arc-shaped rare earth magnet 1 at a high precision level is quite difficult work, and cracks and drop-offs readily arise to invite a poor manufacturing yield rate. Furthermore, particles of the raw material of rare earth magnet may increase the difficulty in finishing an arc-shaped the rare earth magnet 1 to be ready for mounting in a soft-magnetic frame 2.

A rare earth magnet fabricated by compression molding from isotropic rare earth iron based melt-spun flakes mixed with a binder (e.g., an epoxy resin) for 1.5–3.0 weight %, in general, and heated for curing the binder, exhibits a density of 5.8–6.1 g/cm³. Whereas, the magnet fabricated by extrusion molding from the same rare earth iron based melt-spun flakes, which needs a binder (e.g., 12-nylon) for more than 5 weight %, exhibits a density of 5.7 g/cm³ or less. Since the maximum energy product [BH] max of the magnet is dependent on the quantity of the filled rare earth iron based melt-spun flakes, or the magnet density, a compression molded rare earth magnet that can offer a higher [BH] max is more advantageous for providing a strong static magnet field in the air-gap between an armature and a magnet in the permanent magnet field small DC motors, as compared with the one fabricated by extrusion molding.

A first problem to be solved by the present invention is the problem described in Japanese Patent Laid-open Publication No. H6-236807, meaning that "since there is a substantially wide variation in the weighing at molding, it has been considered to be difficult to provide by compression molding thin arc-shaped magnets having a maximum thickness of 1 mm or less at a dimensional accuracy ±30 $\mu$m". Even if the problem is solved, however, the mechanical strength of the compression molded rare earth magnet is low at the room temperature area, and brittle, because of a lower amount of resin contained therein. So, the arc-shaped rare earth magnets fabricated by compression molding are not suitable for fixing and securing in a soft-magnetic frame in accordance with the method taught in the Japanese Patent Laid-open Publication No. H10-201206 and the Japanese Patent Laid-open Publication No. H11-18390, meaning that attaching a magnet "at the engagement portion between the hooking protrusions of soft-magnetic frame with the magnet slightly bent". Namely, a second problem to be solved by the present invention is to contrive new means for securing an arc-shaped rare earth magnet in a soft-magnetic frame by appropriately taking the physical properties of the magnet into consideration. In addition, since "the [BH] max is higher than that of an arc-shaped rare earth magnet fabricated by extrusion molding", a third task to be attained in the present invention is to offer new additional means for controlling the distribution of flux density in the air-gap by a known means of providing the magnet with an appropriate shape for reducing the cogging torque.

SUMMARY OF THE INVENTION

A permanent magnet field small DC motor of the present invention has a stronger static magnet field in the air-gap between an armature and the magnet, by employing an arc-shaped rare earth magnet of 1 mm thick or less fabricated by compression molding. New control means for controlling distribution of flux density in the air-gap between an armature and the magnet as proposed by the present invention enhances the high precision revolving performance by further reducing cogging torque in compact and high output motors.

DETAILED DESCRIPTION OF THE INVENTION

Figure 1:
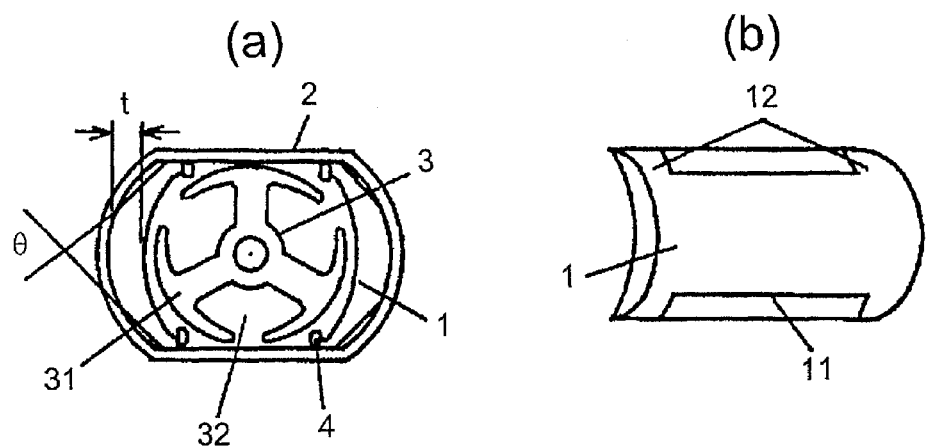
FIG. 1(a) shows a cross sectional view in a key portion of a motor in an exemplary embodiment of the present invention.
FIG. 1(b) is a perspective view of a magnet used in the motor.
Figure 2:
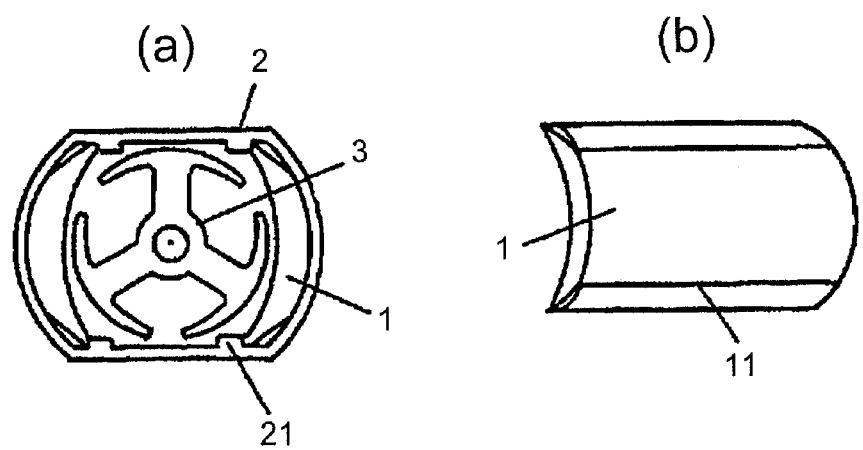
FIG. 2(a) shows a cross sectional view in a key portion of a conventional motor.
FIG. 2(b) is a perspective view of a magnet used in the motor.
Figure 3:
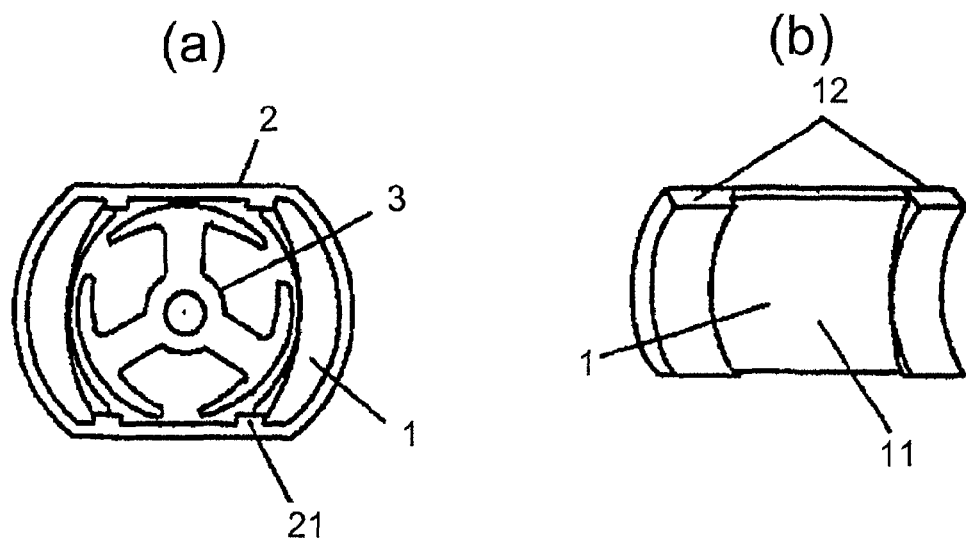
FIG. 3(a) shows a cross sectional view in a key portion of a conventional motor.
FIG. 3(b) is a perspective view of a magnet used in the motor.

Referring to FIGS. 1(a) and 1(b), an arc-shaped rare earth magnet 1 having a maximum thickness t of 1 mm or less is fabricated by compression molding from rare earth-iron based melt-spun flakes mixed with a binder, the outer surface 12 at both ends in the thrust direction of the magnet are shaped in accordance with the inner surface of a soft-magnetic frame 2, while a certain clearance is provided between the outer surface of the magnet 1 in the middle part in the thrust direction at both ends 11 in the circumferential direction and the soft-magnetic frame 2. The magnets are fixed and secured opposing to each other with an armature 3 disposed in between, to complete a finished permanent magnet field small DC motor.

An objective of forming the clearance is to provide the arc-shaped rare earth magnet 1 with a certain specific portion having no back yoke, in the middle part, in the thrust direction at both ends 11 in the circumferential direction. Thereby, the specific portion of the magnet with a demagnetization curve that is smaller than that at the center of magnetic pole in the circumferential direction is provided. The clearance may be formed by modifying part of a shape in the soft-magnetic frame 2. However, it is preferably provided by:

(1) Forming a plane surface at an angle θ 53–82° to the outer surface 12 in the middle part in the thrust direction of the arc-shaped rare earth magnet 1 at both ends in the circumferential direction. A clearance can be provided between both of the end-surfaces 11 and the soft-magnetic frame 2, totally through compression molding without requiring any post machining process; or (2) Making the curvature of the outer surface, in the middle part, in the thrust direction at both ends in the circumferential direction of the arc-shaped rare earth magnet 1 different from that of the outer surface at both ends in the thrust direction. A clearance can be provided between both of the end-surfaces 11 and the soft-magnetic frame 2 totally through compression molding, without needing any post machining process. The arc-shaped rare earth magnet 1 may be attached to the soft-magnetic frame 2 by inserting it with the pair of outer surfaces 12 proceeding along the inner surface of the soft-magnetic frame 2, and fixing and securing it at both ends in the revolving direction using, for example, a spring 4 of U-shape. In this way, a compression-molded arc-shaped rare earth magnet 1, which is brittle and vulnerable to shearing force, yet can withstand relatively strong pressure, can be mounted in the soft-magnetic frame 2 easily and safely without cracks or dropping-off.

The above arc-shaped rare earth magnet 1 has been fabricated from a granular compound, particle diameter less than 250 μm or less, of rare earth iron based melt-spun flakes mixed with an epoxy-resin binder for 1.5–3 weight %. The granular compound is compression molded into an arc-shaped molding cavity of compressed granular compound, and then it is cured of epoxy-resin binder. The rare earth iron based melt-spun flakes of a $RE_2TM_{14}B$ (RE is Nd, Pr:TM are Fe, Co) phase, the grain size of 300 nm or less, exhibit an intrinsic coercivity Hci 8–10 kOe, and remanence 7.4–8.6 kG. Or, it may contain isotropic rare-earth iron based melt-spun flakes of nano-composite structure having both the soft magnetic phase and the hard magnetic phase.

The rare earth iron based melt-spun flakes as referred to in the present invention are the ones as described, for example, by J. F. Herbest, in "Rare Earth-Iron-Boron Materials; A New Era in Permanent Magnets", Ann. Rev. Sci. Vol-16. (1986). That is, molten alloy containing Nd:Fe:B in an approximate proportion 2:14:1 is rapidly-solidified, and precipitates the isotropic $Nd_2Fe_{14}B$ phase by heat treatment. Any $Nd_2Fe_{14}B$ phase would be available as long as the grain size of single magnet domains is approximately 300 nm or less. Or, a sort of nano-composite of soft magnet phase of, for example, αFe, $Fe_3B$ and hard magnet phase, such as $Nd_2Fe_{14}B$, $Sm_2Fe_{17}N_3$, combined by a strong exchange interaction as a result of heat treatment applied on rare earth iron based melt-spun flakes can serve the purpose. The reason why the rare earth iron based melt-spun flakes are specifically nominated is that as a function of magnetization field, they exhibit both a remanence Br and a coercivity HcB both increasing simultaneously, and hence, exhibit a well-balanced demagnetization (B—H) curve even in an unsaturated magnetized state. For example, the permeance coefficient at the magnetic pole is different from that at both of the ends in the circumferential direction having no back yoke, and with respect to the magnetization of the arc-shaped rare earth magnet 1, the demagnetization (B—H) curves (remanence Br and coercivity HcB) at the magnetic pole become different from that at the ends 11 in the circumferential direction. This may be described in the following way, when a magnet is fabricated from rare earth iron based melt-spun flakes, it exhibits different magnetic properties in the magnetic pole and both of the ends in the circumferential direction as if the magnet is a unitized permanent magnet formed of different magnets, despite the fact that it is formed of a same material.

The arc-shaped rare earth magnet 1 fixed along the inner surface of the soft-magnetic frame 2 is magnetized, and then it undergoes the initial demagnetization by heating. The portion of the magnetic pole which has a back yoke and shows a large demagnetization curve (large remanence value for Br and coercivity for Hcb), exhibits small demagnetization, while the outer portion in the middle part in the thrust direction of the magnet at both ends 11 in the circumferential direction, which has no back yoke, exhibits large demagnetization at both ends. The distribution of flux density in the air-gap is improved much closer to a sine curve, and a rate of cogging torque reduction is greater than that of torque reduction. Thus, the distribution of flux density in the air-gap to the iron core of the armature 3 is put under control.

As described in the foregoing, the permanent magnet field small DC motors of the present invention comprise, not a conventional arc-shaped rare earth magnet of maximum thickness 1 mm or less fabricated by extrusion molding, but an arc-shaped rare earth magnet fabricated from rare earth iron based melt-spun flakes mixed with a binder by compression molding which has a higher [BH] max than that of the conventional magnet. The arc-shaped rare earth magnet fabricated by compression molding containing more rare earth iron based melt-spun flakes exhibits an increase of both a remanence Br and a coercivity Hc simultaneously, as a function of magnetizing field, and hence, exhibits a well-balanced magnetization curve even in an unsaturated magnetized state. Under the same magnetization conditions, a stronger static magnet field is provided in the air-gap between the magnet and the armature, so that a stronger output is obtained. Especially, with respect to the issue of cogging torque, which becomes significant along with the increasing output, the present invention proposes new improvement means of controlling the distribution of flux density in the air-gap, which includes (1) making a demagnetization curve in the middle part in the thrust direction of the arc-shaped rare earth magnet at both ends in the circumferential direction small, making use of the reverse magnet field during magnetizing, (2) making use of the difference in demagnetization by heat, in addition to the conventionally known means for reducing the cogging torque by providing a magnet with a unique shape.

Now in the following, the present invention is described in further detail. The embodiments are only examples and not to be understood limitedly.

[Binder Composition]

An epoxy resin synthesized from bisphenol type epoxyoligomer (C1), weight average molecular weight Mw 1400, and blocked-isocyanate (C2) which is synthesized from 4-4'-diphenylmethan diisocyanate (1 mol) and methylethylketon-oxime (2 mol), are dissolved in acetone and the 50 wt. % aceton solution is used as binder. A ratio of the isocyanate—NCO group versus a sum of the alcoholic hydroxide group and the epoxy group in the molecular chain of epoxyoligomer is 0.8.

supplied to a powder compacting press (compression molding machine), measured in volume and compressed at 8 ton/cm$^2$ to form an arc-shaped green compact having a thickness of 1 mm or less. The compression molded arcuate item was cured at 160° C. for 2 min. Thus, samples of so-called compression molded arc-shaped rare earth magnet were provided for 30 pcs. each class. Dimensions of the magnet are: Outer radius 3.65 mm; Inner radius 3.55 mm; Maximum thickness 0.90 mm; and Length in the thrust direction 15.5 mm.

The deviation of the maximum thickness 0.9 mm among the finished arc-shaped rare earth magnets (n=30) in relation to the upper limit of particle diameter of granular compound used is represented in the following formula (regression coefficient 0.988).

$$A=0.0003P^2-0.0718P+24.745 \qquad (1)$$

where A: represents range of thickness deviation($\pm\mu$m), and

P: the largest particle diameter $\mu$m of the granular compound.

As shown from the regression formula, when the granular compound having the particle diameter 250 $\mu$m or less is used, the thickness deviation in the thin arc-shaped magnet of less than 1 mm thick can be suppressed to be less than ±30 $\mu$m, and actually less than ±26 $\mu$m. Meanwhile, comparative

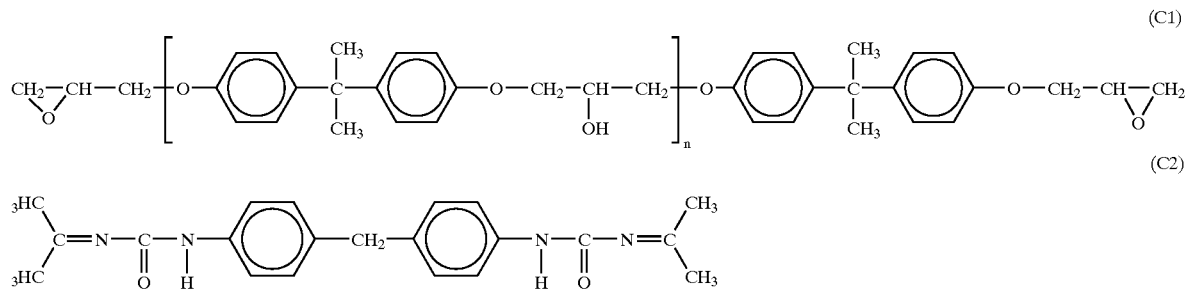

[Granular Compound]

Magnetic flakes used in this invention are a product from Magnequench International In, Co. (Trade Mark: MQP-B), which is a rare earth-iron based melt-spun flake with a thickness of 20–30 $\mu$m and having an alloy composition of $Nd_{12}Fe_{77}Co_5B_6$, and an isotropic $Nd_2Fe_{14}B$ phase with a grain size having a diameter of 20–50 nm.

Epoxy resin resolved in acetone (2.5 weight % in solid composition) and rare earth-iron based melt-spun flakes 97.5 weight % were wet-mixed using a sigma blade kneader. Then, it was heated to 80–90° C. to evaporate the acetone, and formed into a solid block at room temperature. The solid block was crushed using a cutter mill under room temperature, and the crushed granule was classified in accordance with the particle diameter into granular compounds of 500, 350, 250, 212 and 150 $\mu$m. Finally, it was mixed homogeneously with a V-blender at a temperature of 40° C. or lower, after adding calcium stearate powder for 0.2–0.6 weight portion.

[Particle Diameter of Granular Compound and Dimensional Accuracy of Thin Arc-Shaped Green Compacts]

A granular compound was classified by particle diameter into classes smaller than 500, 350, 250, 212 and 150 $\mu$m, respectively. The granular compound of each class was samples for the same dimensions were also provided using pellets of 95 weight %, the same rare earth iron based melt-spun flakes mixed with 5 weight % of 12-nylon at 260° C. The comparative samples were fabricated by the extrusion molding disclosed in the Japanese Patent Laid-open Publication No. H6-236807, with the temperature at the tip end of the molder dice set at 175° C., which is a temperature lower than melting point of 12-nylon. The thickness deviation among the comparative samples was ±30 $\mu$m, at the portion of maximum thickness 0.9 mm.

It may be understood that the thin arc-shaped rare earth magnets having the same, or higher, dimensional accuracy as those fabricated by extrusion molding, can be fabricated from a granular compound by compression molding using a powder compacting press in accordance with the present invention. Which, according to the Patent Publication No. H6-236807, was described to be difficult.

[Magnetic Characteristics]

The granular compound having particle diameter of 250 $\mu$m or less was compressed at 8 ton/cm$^2$ to form a round column 5 mm high with a diameter of 5 mm. The column was cured at 160° C. for 2 min. to provide a column shaped rare earth magnet. The magnet was pulse-magnetized at 50 kOe in the direction of height. A demagnetization curve was measured using a vibrating sample magnetometer (VSM) at measuring magnetic field ±20 kOe.

Figure 4:
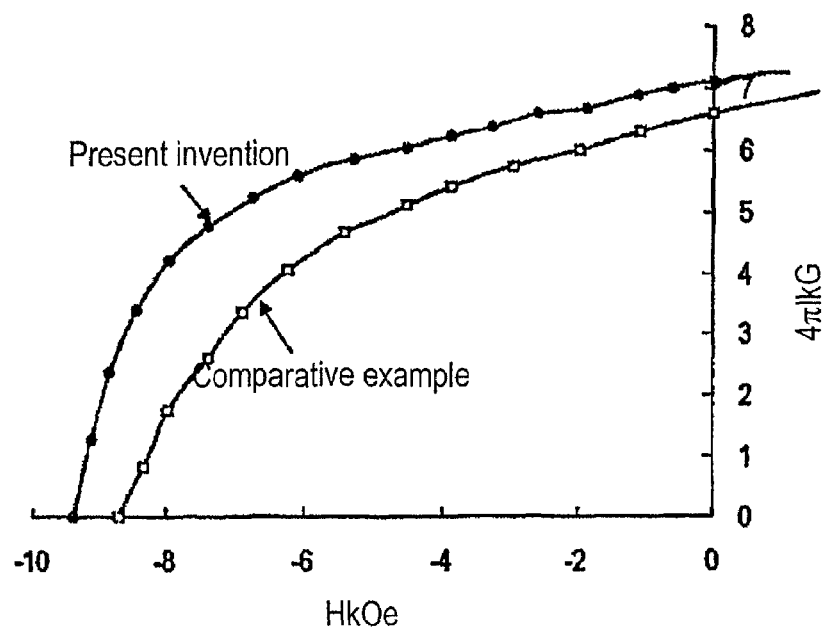
FIG. 4 is a characteristics chart showing demagnetization curves.

Also, a demagnetization curve was measured with a rare earth magnet fabricated by extrusion molding from pellets of rare earth iron based melt-spun flakes 95 weight % mixed with 12-nylon 5 weight % at 260° C., molten and solidified. FIG. 4 compares the rare earth magnet fabricated by compression molding in accordance with the present invention and the comparative rare earth magnet fabricated by extrusion molding, with respect the to demagnetization curve. Table 1 shows the magnetic characteristics derived from the demagnetization curve.

As indicated in FIG. 4 and Table 1, the magnet in the present invention exhibits a higher [BH] max. as compared with that of the comparative sample. Supposed reasons for the higher [BH] max. include, a higher packing density of rare earth iron based melt-spun flakes in the magnet of the present invention, whereas, the magnetic properties deteriorated in the comparative sample because the flakes were kneaded with a strong shearing force under a high temperature 260° C., which brought about oxidation of the crushed flakes.

TABLE 1

|  | Coercivity Hci kOe | Remanence 4 πIr kG | Maximum energy product [BH]max MGOe | Squareness Hk |
|---|---|---|---|---|
| Present Invention | 9.53 | 6.87 | 9.55 | 2.59 |
| Comparative Example | 8.66 | 6.58 | 8.30 | 2.24 |

[Withstanding Stress and Fixing of Magnet to Soft-magnetic Frame]

A granular compound of particle diameter 250 μm or less was delivered to a powder compacting press, measured in volume, and compressed at 8 ton/cm$^2$ to form an arc-shaped green compact of less than 1 mm thick. It was cured at 160° C. for 2 min. to provide a so-called compressive-formed arc-shaped rare earth magnet. Dimensions of the magnet are: Outer radius 3.65 mm; Inner radius 3.55 mm; Maximum thickness 0.90 mm; and Distance in the thrust direction 15.5 mm. Also, a comparative sample of a rare earth magnet having the same shape was fabricated by extrusion molding from pellets of rare earth iron based melt-spun flakes 95 weight % and 5 weight % of 12-nylon kneaded at 260° C., molten and solidified.

Figure 5:
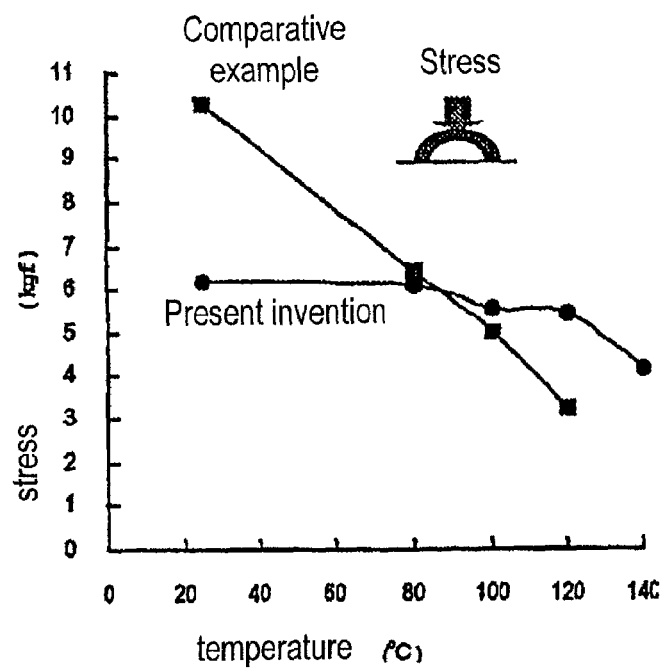
FIG. 5 is a characteristics chart showing the temperature dependency of breaking stress.

FIG. 5 is a characteristics chart showing the temperature dependence of the withstanding stress of the above arc-shaped rare earth magnets. The withstanding stress refers to a load kgf given to the magnet at the portion of maximum thickness when it is broken, as shown in the drawing.

As it is clear from FIG. 5, the mechanical strength at room temperature of the compression-molded arc-shaped rare earth magnet in the present invention is as low as approximately 60% of the extrusion-molded counterpart of the same dimensions, and brittle having the least bending property. Therefore, the magnet is not suitable for mounting in a soft-magnetic frame in accordance with a method described in the Japanese Patent Laid-open Publication No. H10-201206 or the Japanese Patent Laid-open Publication No. H11-18390, meaning, "fitting to be engaged between the hooking protrusions by slightly bending the arc-shaped rare earth magnet". If the magnet in the present invention is slightly bent and inserted in a soft-magnetic frame, the magnet is liable to case breakage, or even falling-off, at the engaged portion. Therefore, the magnets of the present invention are not suitable for mounting in the frame at an agreeable yield rate in the industrial scale.

It is possible to glue a magnet of the present invention to a soft-magnetic frame. However, as described in the Japanese Patent Laid-open Publication No. H10-201216 and the Japanese Patent Laid-open Publication No. H11-18390, it is not an appropriate method to glue a magnet to a soft-magnetic frame for this type of permanent magnet field small DC motors.

Magnets of the present invention can withstand a pressing stress in excess of 6 kgf at room temperature, as shown in FIG. 5. Comparing to the comparative sample, the withstanding value is maintained until a temperature as high as approximately 120° C. So, it is preferred to fix a pair of the magnets 1 disposed along the inner surface of the soft-magnetic frame 2 with a U-shaped spring 4 which presses the magnet 1 at both ends in the circumferential direction, as shown in FIG. 1. The strength of fixing the magnet 1 to the soft-magnetic frame 2 generally depends on the pressing force of a spring used. A pressing force of 0.5 kgf or less is enough for a generally considerable operating temperature range. So, a safety index relative to the allowable compression strength is more than ten times higher over the whole operating temperature range up to 120° C., which is the highest possible temperature with the permanent magnet field small DC motors, taking into consideration the allowable pressing stress and its temperature dependency. Thus, the magnet is mounted and secured with a sufficiently high reliability.

[Effect of the Portion of Magnet which does not Employ the Soft-Magnetic Frame as Back Yoke]

Figure 6:
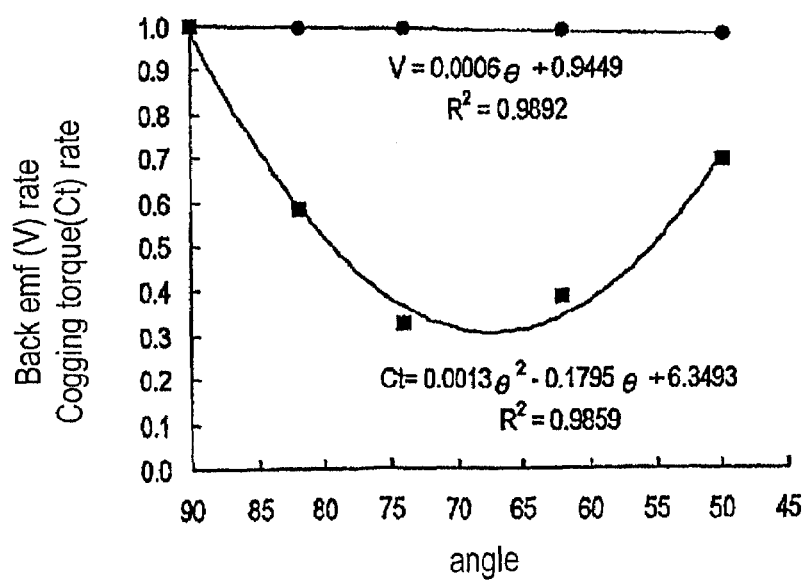
FIG. 6 is a characteristics chart showing the changes of cogging torque and back electromotive force (back emf) relative to an angle.

FIG. 6 shows a relationship among the angle θ, referring to FIG. 1, the rate of the cogging torque and the Back electromotive force (Back emf) with an arc-shaped rare earth magnet. The magnet is provided with a plane surface with an angle θ to the curving outer surface of the compression mold, in the middle part (distance 12.5 mm) in the thrust direction of the magnet at both ends in the circumferential direction, for forming a clearance having no back yoke with respect to a soft-magnetic frame. The dimensions of the magnet are: Outer radius 3.65 mm; Inner radius 3.55 mm; Maximum thickness 0.90 mm; and Distance in the thrust direction 15.5 mm. Values at angle θ of the plane surface are specified based on the values at an assumed 90° angle derived from the Japanese Patent Laid-open Publication No. H10-201206. In the permanent magnet field small DC motor used for measurement, the Back emf V is 0.218 mV/rpm, and the cogging torque Ct is 1.15 g-cm, at θ=90°.

As seen in the drawing, the Back emf V decreases linearly relative to the angle θ as derived from the regression formula, but the decrease is as small as 5% in a range of θ from 90° to 53°. The cogging torque Ct, however, shows a significant change in a second-order function relative to the angle θ and the change reaches the highest at approximately θ=65°. The cogging torque is reduced by almost 70% at that highest point. Even in a range between 82° to 53°, it is reduced by more than 40% from the value at 90°.

The above-described advantage has been brought about by the thin arcuate rare earth magnet having at both ends in the circumferential direction, a region having no back yoke and being fabricated from rare earth iron based melt-spun flakes, which exhibits both a remanence Br as a function of magnetizing field and a coercivity HcB both increasing simultaneously and hence, exhibits a well-balanced magnetization curve even in an unsaturated magnetized state. Thus, the permanent magnet field exhibits a magnetic performance as if different magnets having different respective properties were unified into one magnet.

The arc-shaped rare earth magnet as disclosed in the Japanese Patent Laid-open Publication No. H11-18390, having an engagement portion to be engaged with a hooking protrusion of a soft-magnetic frame and a portion for reducing cogging torque, namely, a rare earth magnet which has two or more shapes in the cross section along the so-called thrust direction, cannot be fabricated by extrusion molding as taught in the Japanese Patent Laid-open Publication No. H6-236807. However, by the compression molding of the present invention, the arc-shaped rare earth magnet with the portion having no back yoke of the soft-magnetic frame can be provided through either (1) providing a plane surface at an angle θ 53°–82° to the curving outer surface of the compression mold, in the middle part in the thrust direction of the arc-shaped rare earth magnet at both ends in the circumferential direction, or (2) making a curvature of the outer surface in the middle part in the thrust direction of the magnet different from that of the outer surface at both ends in the thrust direction. In either of the cases, an arc-shaped rare earth magnet can be formed to a finished magnet totally by a powder compacting press (compression molding process), without using any post machining process.

[Effect of Heat Demagnetization of Magnet in No Back Yoke Portion]

Figure 7:
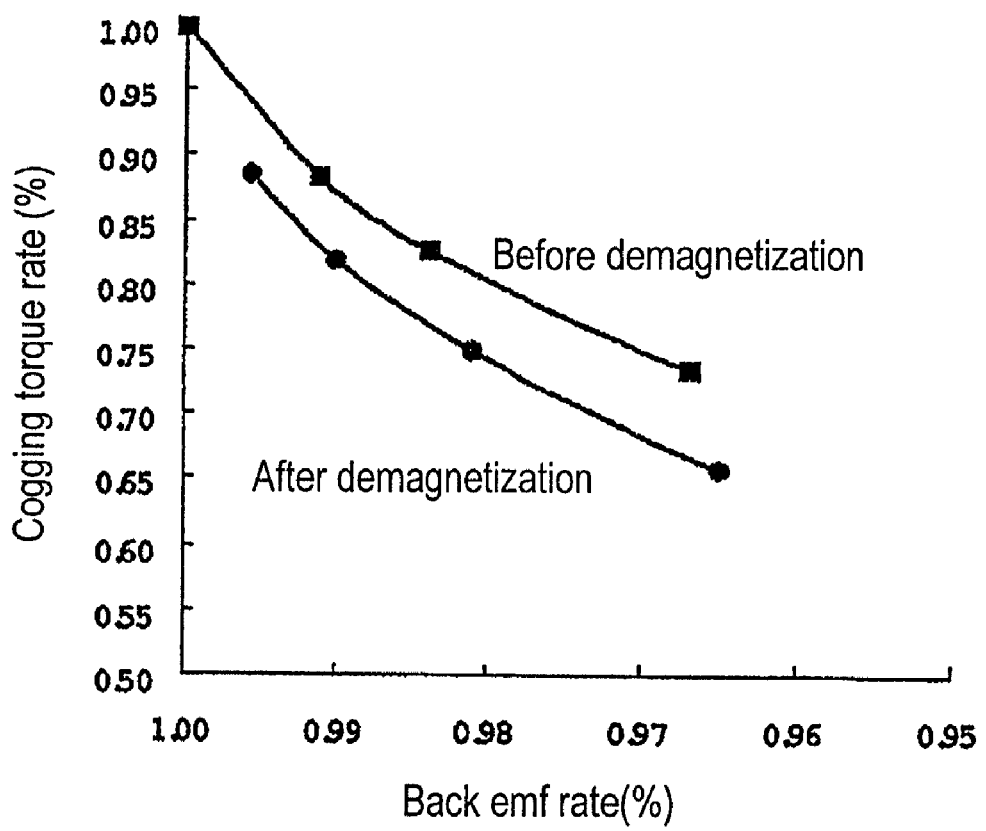
FIG. 7 is a characteristics chart showing the changes of cogging torque and back emf relative to demagnetization by heat.

An unsaturated magnetization was applied on an arc-shaped rare earth magnet provided with a plane surface at an angle θ 62° to the curving outer surface of the compression mold, in the middle part in the thrust direction (distance 12.5 mm) at both ends in the circumferential direction for forming a certain clearance having no back yoke with respect to a soft-magnetic frame, in 4 stages with a capacitance 2000 μF, at 1500–2400 V. FIG. 7 is a characteristics chart showing a change in the cogging torque and the Back emf, before and after a demagnetization conducted by exposing to a temperature 140° C. for 5 min. The dimensions of the magnet are: Outer radius 3.65 mm; Inner radius 3.55 mm; Maximum thickness 0.90 mm; and Distance in the thrust direction 15.5 mm. The values are those which have been normalized to the cogging torque and the Back emf of the magnet magnetized with the maximum magnetization field, at 2000 μF., 2400 V, before the demagnetization by heat. In the permanent magnet field small DC motor measured here, the reference Back emf V is 0.214 mV/rpm, and the cogging torque Ct is 0.46 g-cm.

As shown in the chart, when a permanent magnet field small DC motor of the present invention is demagnetized by heat, the reduction of Back emf V generally remains at 0.5% or less. However, the cogging torque is further reduced by approximately 10%. When an arc-shaped rare earth magnet mounted and fixed along the inner surface of a soft-magnetic frame is magnetized and then receives an initial demagnetization by heat, the portion of a center of a magnetic pole having a back yoke exhibits a small demagnetization, while the outer surface in the middle part in the thrust direction of the magnet at both ends in the circumferential direction, which ends having no back yoke, exhibit a large demagnetization, even when the magnet has a large demagnetization (B—H) curve (large remanence Br and coercivity HcB). As a result, the distribution of flux density in the air-gap is further improved to be closer to a sine curve and the larger cogging torque reduction is obtained relative to the reduction of Back emf caused by the demagnetization.

INDUSTRIAL APPLICABILITY

A permanent magnet field small DC motor of the present invention comprises an arc-shaped rare earth magnet of maximum thickness 1 mm, fabricated by compression forming from rare earth iron based melt-spun flakes mixed with a binder, the magnet being provided with a certain portion having no back yoke at both ends in the circumferential direction for forming a clearance with respect to a soft-magnetic frame when it is fixed therein with a pressing force. The arc-shaped rare earth magnet containing more rare earth iron based melt-spun flakes exhibits both a remanence Br as a function of a magnetizing field and a coercivity HcB both increasing simultaneously and hence, exhibits a well-balanced magnetization curve even in an unsaturated magnetized state. Under the same magnetization conditions, the magnet provides a stronger static magnetic field in the air-gap between the magnet and the armature, hence, a higher output becomes available. The problem of cogging torque, among others, which becomes significant along with the increasing output, is improved by new means proposed in the present invention of controlling the distribution of magnetic flux density in the air-gap, in addition to an improvement by well known means of controlling a specific shape. The new means in the present invention includes (1) making a demagnetization curve small in the middle part of the magnet in the thrust direction at the end part in the circumferential direction, making use of the reverse magnet field at magnetization, and (2) making use of a difference caused by the heat demagnetization. Thus, a compact high output small DC-motor with a highly accurate revolving performance can be implemented in accordance with the present invention.

What is claimed is:

1. A permanent magnet field small DC motor comprising:
a soft-magnetic frame; and
an arc-shaped permanent magnet fixed in said soft-magnetic frame,
wherein an outer surface of said arc-shaped permanent magnet has a pair of end portions and a middle portion therebetween in a thrust direction, said end portions fit along an inner surface of said soft-magnetic frame, and said middle portion has a pair of recessed sections that are recessed on outer middle portion regions of said middle portion with respect to said end portions.

2. The permanent magnet field small DC motor of claim 1, further comprising:
a pair of said arc-shaped permanent magnets; and
a pair of springs,
wherein said arc-shaped permanent magnets are disposed opposing each other in said soft-magnetic frame with said end portions fitting along said inner surface of said soft-magnetic frame, and said arc-shaped permanent magnets are fixed at ends in a direction of curvature using said springs, respectively.

3. The permanent magnet field small DC motor of claim 2, wherein said arc-shaped permanent magnets comprise a compression molded material of rare earth iron based melt-spun flakes and a binder.

4. The permanent magnet field small DC motor of claim 3, wherein a curvature of said recessed sections of said arc-shaped permanent magnets is different from that of said end portions so that said soft-magnetic frame does not function as a back yoke at said recessed sections.

5. The permanent magnet field small DC motor of claim 2, wherein said arc-shaped magnets have a maximum thickness of 1 mm.

6. The permanent magnet field small DC motor of claim 1, wherein clearances are formed between said recessed sections of said arc-shaped permanent magnet and said soft-magnetic frame.

7. The permanent magnet field small DC motor of claim 6, further comprising a pair of said arc-shaped permanent magnets, wherein said arc-shaped permanent magnets oppose each other and are fixed along said inner surface of said soft-magnetic frame, and each of said arc-shaped permanent magnets has a rate of demagnetization that increases along with a distance from a center of a magnetic pole towards ends in a direction of curvature, whereby the rate of demagnetization is greatest between said recessed sections and said soft-magnetic frame.

8. The permanent magnet field small DC motor of claim 1, further comprising a pair of said arc-shaped permanent magnets fixed along said inner surface of said soft-magnetic frame opposing each other, wherein said arc-shaped permanent magnets exhibit different demagnetization curves at least by unsaturated magnetization.

9. The permanent magnet field small DC motor of claim 1, wherein said recessed sections are planar.

10. An optical pickup device comprising:
a permanent magnet field small DC motor comprising a soft-magnetic frame; and
an arc-shaped permanent magnet fixed in said soft-magnetic frame,
wherein an outer surface of said arc-shaped permanent magnet has a pair of end portions and a middle portion therebetween in a thrust direction, said end portions fit along an inner surface of said soft-magnetic frame, and said middle portion has a pair of recessed sections that are recessed on outer middle portion regions of said middle portion with respect to said end portions.

11. The optical pickup device of claim 10, wherein said recessed sections are planar.

* * * * *